(12) United States Patent
Zhang

(10) Patent No.: US 9,344,897 B2
(45) Date of Patent: May 17, 2016

(54) ESTIMATING TIMING AND FREQUENCY INFORMATION FOR MULTIPLE CHANNEL WIRELESS COMMUNICATION SYSTEMS

(75) Inventor: Ning Zhang, Saratoga, CA (US)

(73) Assignee: QUALCOMM Incorporated, San Diego, CA (US)

(*) Notice: Subject to any disclaimer, the term of this patent is extended or adjusted under 35 U.S.C. 154(b) by 2439 days.

(21) Appl. No.: 12/031,634

(22) Filed: Feb. 14, 2008

(65) Prior Publication Data

US 2008/0225761 A1 Sep. 18, 2008

Related U.S. Application Data

(60) Provisional application No. 60/894,595, filed on Mar. 13, 2007.

(51) Int. Cl.
| | |
|---|---|
| H04B 7/12 | (2006.01) |
| H04W 16/14 | (2009.01) |
| H04L 5/00 | (2006.01) |
| H04L 27/26 | (2006.01) |
| H04L 25/02 | (2006.01) |

(52) U.S. Cl.
CPC ............. *H04W 16/14* (2013.01); *H04L 5/0048* (2013.01); *H04L 25/0228* (2013.01); *H04L 27/2613* (2013.01); *H04L 27/2675* (2013.01); *H04L 5/0007* (2013.01)

(58) Field of Classification Search
CPC . H04L 5/0007; H04L 27/2613; H04L 5/0048; H04L 27/2656; H04L 27/2657; H04L 27/2662; H04L 25/0228; H04L 5/0051; H04L 27/2647; H04L 5/005
See application file for complete search history.

(56) References Cited

U.S. PATENT DOCUMENTS

| | | | |
|---|---|---|---|
| 6,032,033 A * | 2/2000 | Morris et al. | ............... 455/277.2 |
| 6,128,276 A | 10/2000 | Agee | |
| 6,522,898 B1 | 2/2003 | Kohno et al. | |

(Continued)

FOREIGN PATENT DOCUMENTS

| | | |
|---|---|---|
| EP | 0622911 A2 | 11/1994 |
| EP | 1185048 A2 | 3/2002 |

(Continued)

OTHER PUBLICATIONS

Chen et al. "Symbol Timing and Channel Estimation of IEEE802.11a based on OFDM", IEEE Canadian Conference on Electrical and Computer Engineering, vol. 3, May 4-7, 2003, pp. 1547-1550.

(Continued)

*Primary Examiner* — Bunjob Jaroenchonwanit
(74) *Attorney, Agent, or Firm* — Holland & Hart LLP

(57) ABSTRACT

One method of estimating timing and frequency information of a payload transmitted through two or more frequency separated channels combines training fields from preambles from the two or more frequency separated channels to construct combined values that may be used to estimate the frequency and timing information. In one embodiment, the combined values may be determined by combining self-correlated training fields from the frequency separated channels. Another method of estimating the timing and frequency information selects the training fields from the preamble of one of the frequency separated channels based upon a signal quality metric. In another embodiment, the selection of the training fields based upon a signal quality metric may be biased to favor a particular channel.

6 Claims, 3 Drawing Sheets

(56) References Cited

U.S. PATENT DOCUMENTS

| | | | |
|---|---|---|---|
| 6,563,858 B1 | 5/2003 | Fakatselis et al. | |
| 6,654,340 B1 | 11/2003 | Jones et al. | |
| 7,366,089 B2 * | 4/2008 | Tehrani et al. | 370/208 |
| 2002/0048317 A1 * | 4/2002 | Boer et al. | 375/219 |
| 2002/0172269 A1 | 11/2002 | Xu | |
| 2003/0002471 A1 | 1/2003 | Crawford et al. | |
| 2003/0072397 A1 | 4/2003 | Kim et al. | |
| 2003/0086366 A1 | 5/2003 | Branlund et al. | |
| 2003/0165187 A1 | 9/2003 | Tesfai et al. | |
| 2004/0072546 A1 | 4/2004 | Sugar et al. | |
| 2004/0086055 A1 | 5/2004 | Li | |
| 2004/0087275 A1 | 5/2004 | Sugar et al. | |
| 2004/0114506 A1 | 6/2004 | Chang et al. | |
| 2004/0136466 A1 | 7/2004 | Tesfai et al. | |
| 2004/0209579 A1 | 10/2004 | Vaidyanathan | |
| 2005/0053170 A1 | 3/2005 | Catreux et al. | |
| 2005/0078649 A1 * | 4/2005 | Tehrani et al. | 370/343 |
| 2005/0138671 A1 * | 6/2005 | Love et al. | 725/123 |
| 2005/0152314 A1 * | 7/2005 | Sun et al. | 370/334 |
| 2005/0233709 A1 * | 10/2005 | Gardner et al. | 455/101 |
| 2005/0276347 A1 * | 12/2005 | Mujtaba et al. | 375/299 |
| 2006/0007898 A1 * | 1/2006 | Maltsev et al. | 370/338 |
| 2006/0029168 A1 * | 2/2006 | Chuang et al. | 375/347 |
| 2006/0140303 A1 * | 6/2006 | Egashira et al. | 375/299 |
| 2006/0146869 A1 | 7/2006 | Zhang et al. | |
| 2006/0159003 A1 | 7/2006 | Nanda et al. | |
| 2006/0250943 A1 * | 11/2006 | Mujtaba et al. | 370/210 |
| 2006/0251193 A1 * | 11/2006 | Kopmeiners et al. | 375/345 |
| 2006/0280154 A1 * | 12/2006 | Kwon et al. | 370/338 |
| 2007/0041322 A1 * | 2/2007 | Choi et al. | 370/235 |
| 2007/0053452 A1 * | 3/2007 | Koo et al. | 375/260 |
| 2007/0204052 A1 * | 8/2007 | Trainin et al. | 709/230 |
| 2007/0207823 A1 * | 9/2007 | van Nee et al. | 455/509 |
| 2007/0230403 A1 * | 10/2007 | Douglas et al. | 370/334 |
| 2007/0298742 A1 * | 12/2007 | Ketchum et al. | 455/186.1 |
| 2008/0045153 A1 * | 2/2008 | Surineni et al. | 455/63.1 |
| 2008/0089450 A1 * | 4/2008 | Zelst et al. | 375/344 |
| 2009/0052433 A1 * | 2/2009 | DiRenzo et al. | 370/350 |
| 2009/0122882 A1 * | 5/2009 | Mujtaba | 375/260 |
| 2009/0303918 A1 * | 12/2009 | Ma et al. | 370/315 |
| 2010/0189167 A1 * | 7/2010 | Pare et al. | 375/219 |

FOREIGN PATENT DOCUMENTS

| | | |
|---|---|---|
| EP | 1220505 A2 | 7/2002 |
| EP | 1231722 A2 | 8/2002 |
| JP | 2000510666 A | 8/2000 |
| JP | 2003101499 | 4/2003 |
| JP | 2006014027 A | 1/2006 |
| JP | 2006295959 A | 10/2006 |
| WO | WO-9741702 A1 | 11/1997 |
| WO | 00/77961 A1 | 12/2000 |
| WO | 03/023995 A1 | 3/2003 |
| WO | 03/075396 A2 | 9/2003 |
| WO | WO-2006069176 A2 | 6/2006 |

OTHER PUBLICATIONS

Schmidl et al. "Robust Frequency and Timing Synchronization for OFDM", IEEE Transactions on Communications, vol. 45, No. 12, Dec. 1997, pp. 1613-1621.

International Search Report and Written Opinion—PCT/US2008/056165, ISA/US, Aug. 22, 2008.

Reddy et al., "On Timing and Frequency Offset Estimation in OFDM Systems," TENCON 2004, 2004 IEEE Region 10 Converence, vol. 3, Nov. 21-24, 2004, pp. 153-156, 1.Institute of Electrical and Electronics Engineers.

Utsunomiya et al.,"A MAC Proposal to IEEE802.11n High Throughput WLAN for 20/40 MHz," Electronics and Communications in Japan (Part I: Communications), vol. 90, No. 1, pp. 1-12, DOI: 10.1002/ecja.20335, translated from Denshi Joho Tsushin Gakkai Ronbunshi, vol. J89-B, No. 2, Feb. 2006, pp. 153-170.

* cited by examiner

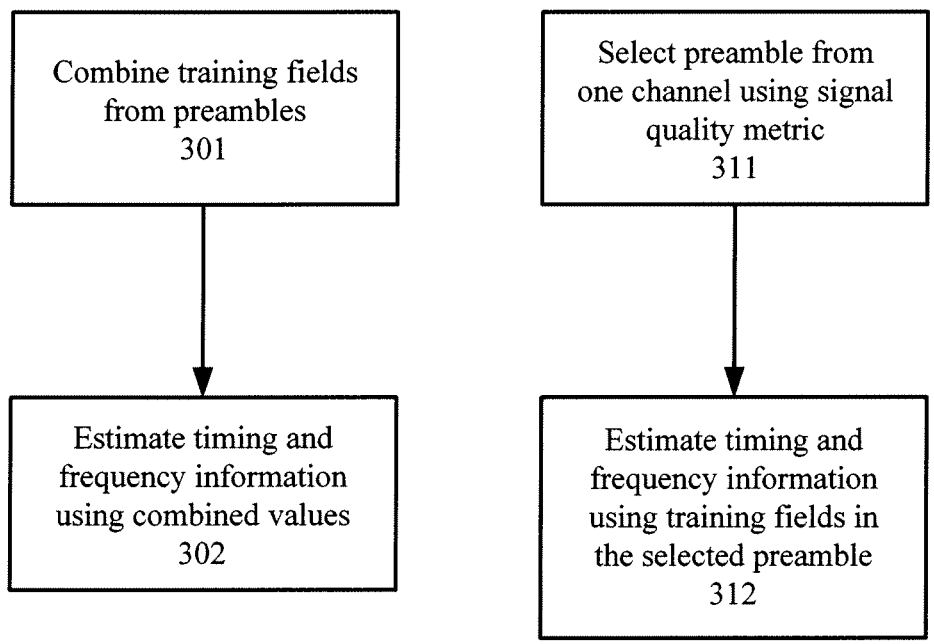

ESTIMATING TIMING AND FREQUENCY INFORMATION FOR MULTIPLE CHANNEL WIRELESS COMMUNICATION SYSTEMS

RELATED APPLICATIONS

This application claims priority of U.S. Provisional Patent Application 60/894,595, entitled "Estimating Timing And Frequency Information For Multiple Channel Wireless Communication Systems" filed Mar. 13, 2007.

BACKGROUND OF THE INVENTION

1. Field of the Invention

Embodiments of this specification relate generally to wireless communication systems and more particularly to a method for estimating frequency and timing information for multiple channel wireless communication systems.

2. Description of the Related Art

Wireless communication systems use frequency allocation to ensure that different RF devices can function in different frequency ranges. In this manner, for example, a user's cell phone does not interfere with other commercial radio systems. These frequency ranges are called bands.

Within a band, the frequency range may be divided into one or more channels. The bands and channels for one form of wireless communication are defined by, for example, the IEEE 802.11 family of standards. In such wireless communication, a transmitter typically transmits data through a channel to one or more receivers.

The IEEE 802.11 standards also define how the data may be configured into data packets that typically include a preamble and a payload. FIG. 1 illustrates an exemplary packet 100 including a preamble 101 that precedes a payload 102. In this case, packet 100 is being sent in a legacy channel that is 20 MHz wide. Preamble 101 includes a plurality of training fields that provide important information for the receipt of packet 100.

Training fields are typically comprised of short and long types. Both short and long training fields are well-defined patterns that a receiver may analyze to estimate coarse and fine timing information as well as coarse and fine frequency information associated with the transmitted data packet. This timing and frequency information allows the receiver to accurately recover the payload from the transmitted data packet.

The IEEE 802.11n draft standard, for example, also describes how a transmitter may transmit data through two channels instead of a single channel to increase the overall effective width of the channel used by the transmitter. A wider channel may advantageously increase the transfer rate of data. The two channels are typically chosen from within a selected band such that they do not overlap and are often referred to as a control channel and an extension channel. Typically, the control channel is a channel closer to the center of the selected band and the extension channel is a channel closer to one of the edges of the band.

In a two-channel transmission, a transmitter transmits a payload through both the control and extension channels. Notably, a duplicated preamble including training fields precedes the payload transmission on both the control and the extension channel. For example, FIG. 2 illustrates an exemplary packet 200 including a preamble 201A (which in sent on the control channel) and a duplicated preamble 201B (which is sent on the extension channel) that precede a payload 202. In this case, the control and extension channels are 20 MHz wide, thereby allowing a payload of 40 MHz wide to be transmitted (note that preambles 201A and 201B are shown as frequency separated for illustration purposes and are typically abutting one another). In one embodiment, the center frequencies of the control and extension channels may be separated by 20 MHz. In another embodiment, the center frequencies of the control and the extension channels may be separated by 25 MHz.

Using preambles 201A and 201B on the control and extension channels, respectively, legacy devices listening to these channels can recognize the control and extension data packets and can advantageously decode, for example, the length of packet 200, thereby allowing such legacy devices to avoid collisions and interference from other wireless communication systems.

As in the case of a single channel system, the short and long training fields on the control and extension channels may be analyzed by a receiver to estimate coarse and fine timing information as well as coarse and fine frequency information associated with the transmitted payload. One possible method to develop the frequency and timing estimates analyzes the training fields from either the control or extension channels since the preambles and therefore the training fields are repeated on both channels. In the case of a two-channel system, the training fields from the control channel may be analyzed to estimate the timing and frequency information for the payload transmitted on both the control and extension channels. This method is advantageously relatively simple to implement. Another advantage is that the training fields of the control channel may be relatively less likely to suffer from interference than are the training fields of the extension channel. For example, within certain bands, such as the 2.4 GHz band, some channels are more likely to overlap and cause interference, especially extension channels which may be located close to the edge of the band.

However, the signal characteristics of the control channel may be different from the signal characteristics of the extension channel. For example, the control channel may be several dB lower in signal strength compared to the extension channel. This lower signal strength may increase the difficulty in determining the frequency and timing information from the training fields for the both channels especially if the receiver only examines the training fields of the control channel.

As the foregoing illustrates, what is needed in the art is an improved method to estimate timing and frequency information for data packets sent through two frequency separated channels particularly through a relatively wider channel comprised of a control channel and an extension channel.

SUMMARY OF THE INVENTION

A method of estimating timing and frequency information of a payload transmitted through multiple frequency separated channels is provided. In this method, the training fields from any preambles associated with the payload and transmitted through the multiple frequency separated channels can be combined. After such combination, the timing and frequency information of the payload can be estimated using the combined values. Note that the training fields can include short training fields and/or long training fields.

Combining the training fields can include combining self-correlated training fields from the preambles. For example, in one embodiment, combining the training fields can include maximum ratio combining (MRC) using the preambles. In another embodiment, combining the training fields can include weighting using a signal quality metric. Exemplary signal quality metrics can include a received signal strength indicator (RSSI), a signal to noise ratio (SNR), or an error vector measurement (EVM).

Another method of estimating timing and frequency information of a payload transmitted through multiple frequency separated channels is also provided. In this method, a preamble associated with the payload and transmitted through one of the frequency separated channels is selected. This selection can be based upon a signal quality metric. After the selection is made, the timing and frequency information can be estimated using training fields of the preamble.

In one embodiment, the signal quality metric can include a received signal strength indicator (RSSI), a signal to noise ratio (SNR), or an error vector measurement (EVM). In another embodiment, selecting the preamble can include biasing a particular channel (e.g. a control channel). For example, biasing the particular channel can include selecting an extension channel only when the signal quality metric of the extension channel exceeds the signal quality metric of the control channel by a predetermined amount.

BRIEF DESCRIPTION OF THE DRAWINGS

FIGS. 3A and 3B are flow charts of two exemplary methods of estimating frequency and timing information of a payload transmitted through multiple frequency separated channels.

DETAILED DESCRIPTION

Figure 1:
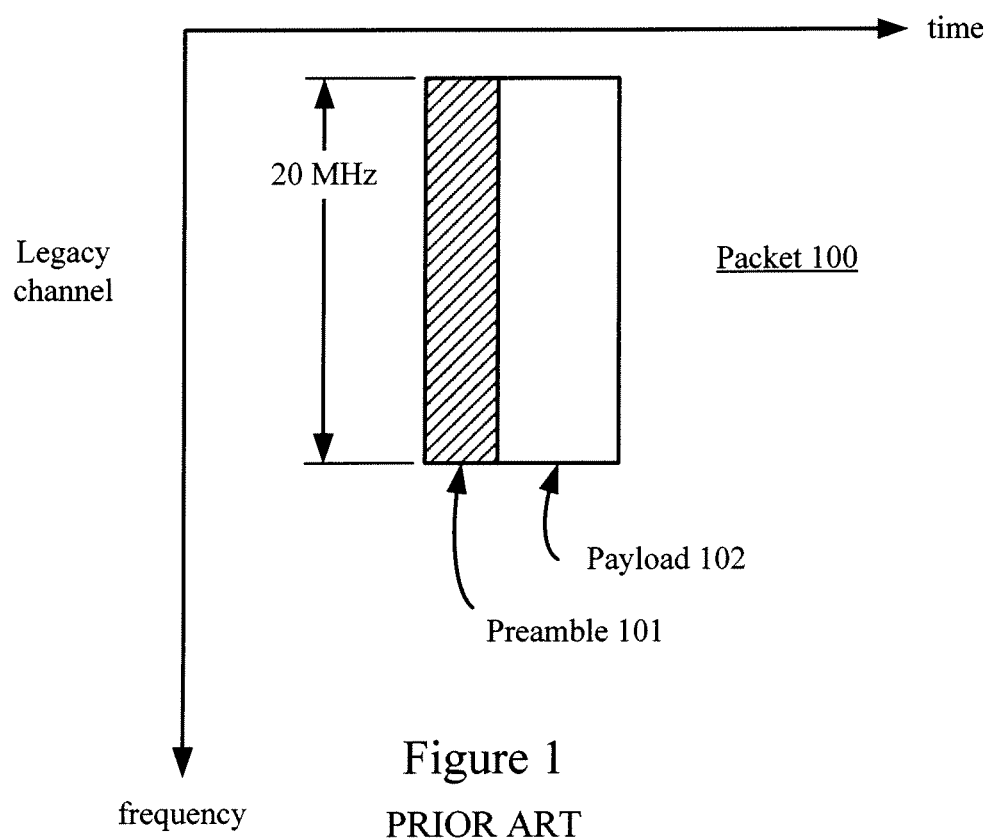
FIG. 1 is a block diagram illustrating a data packet used in a single channel wireless communication system.
Figure 2:
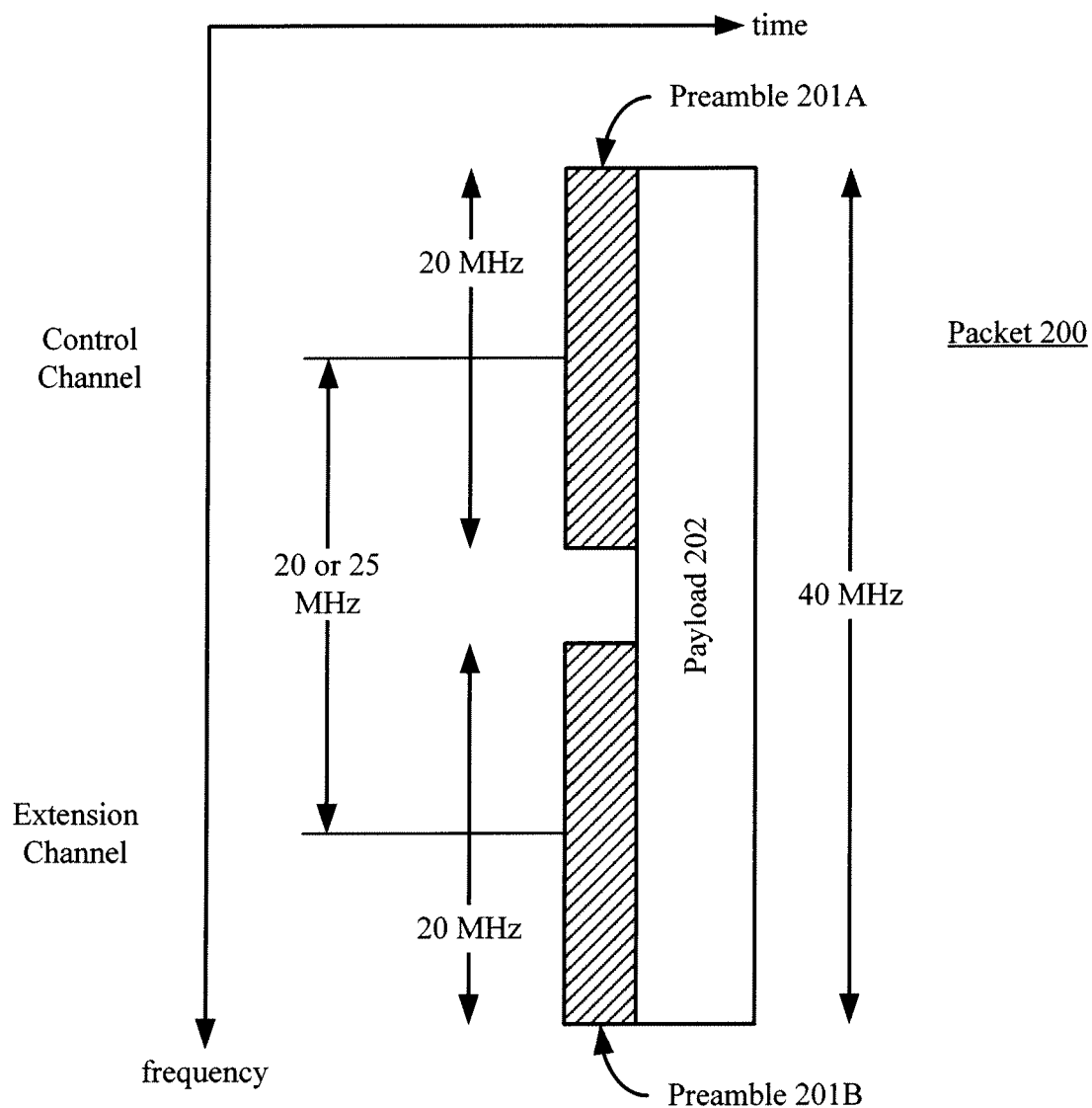
FIG. 2 is a block diagram illustrating a data packet that may be used in a two-channel wireless communication system.

The embodiments described in this specification estimate the frequency and timing information a payload transmitted through multiple frequency separated channels. The frequency and timing estimates may be drawn from the training fields that are contained within the preambles of the data packets of the frequency separated channels (which in the two channel case are typically referred to as control and extension data channels). The methods described below take advantage of the fact that the training fields of both channels are substantially identical. The methods also illustrate that the timing and frequency information for data reception may advantageously be improved by choosing the training fields from a definably superior selection of the control and extension channels, or by combining the training fields from both the control and extension channels.

FIG. 3A illustrates a first method 300 to estimate timing and frequency information of a payload transmitted through multiple frequency separated channels. In method 300, step 301 combines the training fields from preambles associated with the payload and transmitted through the control channel and any extension channels. The training fields may be combined because the training fields from both data packets are substantially identical. Combining wireless communication signals is also described in U.S. patent application Ser. No. 10/682,787, US Publication No. 2005-0078649), entitled "Apparatus and method of multiple antenna receiver combining of high data rate wideband packetized wireless communication signals", filed on Oct. 8, 2003, which is hereby incorporated by reference.

In one embodiment, the training fields may be combined by maximum ratio combining (MRC). MRC combines the training fields by self-correlating selected training fields and adding the correlation results together. For example, the MRC of the fifth short training field may be calculated by self-correlating the fifth short training fields individually from the control and extension channels and then adding the results together. Both short and long training fields may be combined. As is well-known in the art, the self-correlation of a training field develops a value that is closely related to signal strength. Thus, the MRC of the selected training fields is also strongly weighted by signal strength.

MRC combining advantageously places greater weight on the training field with the relatively greater signal strength. Therefore, the resulting combined value is determined more by the training fields in the relatively stronger channel and less by the training fields in the relatively weaker channel. The resulting combined value may then be used to estimate the timing and frequency information for the payload transmitted on both the control and extension channels.

In other embodiments, the combined value may be determined in a manner that weighs individual training fields by a received signal strength indicator (RSSI), a signal to noise ratio (SNR), an error vector measurement (EVM), or other signal quality metrics. Note that some signal quality metrics may not be available early during the beginning of the preamble. In that case, combining training fields by such quality metrics (e.g. RSSI) may be completed later in the preamble when the selected quality metric is available. For example, some wireless communication systems commonly employ automatic gain control elements that can change the gain of the received signal. When such gain changes are applied early during the preamble, for example while the first four short training fields are received, the signal quality metric data may not be available.

Step 302 of method 300 can use the combined values to estimate the timing and frequency information of the payload. One advantage of the MRC method is that relatively accurate frequency and timing estimates may be developed for the payload when the relative quality of training fields for the control channel and the extension channel are relatively low. This is due to the fact that the combined values are determined by data from both channels and the fact that the training fields in the control and the extension channels carry the same information and are substantially similar.

FIG. 3B illustrates a second method 310 to estimate timing and frequency information of a payload transmitted through multiple frequency separated channels. In method 310, step 311 selects a preamble associated with the payload and transmitted through one of the channels. Specifically, the selected preamble is the preamble transmitted on the channel having a relatively higher measure of signal quality compared to any other channel. The training fields of that selected preamble are then used to estimate the frequency and timing information of the payload transmitted on both the control and extension channels in step 312. As previously discussed, signal quality may be measured by RSSI, SNR, EVM or other signal quality metrics. For example, if the RSSI of the control channel were greater than the RSSI of the extension channel, then the selected training fields may be selected from the control channel.

In one embodiment, the training field selection may be biased by a difference threshold. For example, if signal quality is measured by SNR, the SNR of the extension channel may need to exceed the SNR of the control channel by 10 dB before the training fields from the extension channel are selected. This 10 dB difference threshold allows the training field selection to be biased toward the control channel. In another embodiment, the difference threshold may be set by software.

One advantage of the second method (i.e. method 310) over the first method (i.e. method 300) is that the training fields are relatively easier to construct because the training fields are not being computed, but rather selected (via the preamble). Again, some signal quality metrics may not be available early during the beginning of the preamble. In that case, training field selection based on signal quality metrics (e.g. RSSI) may be completed when the selected quality metric is present.

The above exemplary descriptions illustrate how timing and frequency information may be determined in the case of two channels (i.e., the control and the extension channels). In other embodiments, timing and frequency information may be determined for three or more (i.e. multiple) channels.

Although illustrative embodiments of the invention have been described in detail herein with reference to the accompanying figures, it is to be understood that the invention is not limited to those precise embodiment. They are not intended to be exhaustive or to limit the invention to the precise forms disclosed. As such, many modifications and variations will be apparent. Accordingly, it is intended that the scope of the invention be defined by the following Claims and their equivalents.

The invention claimed is:

1. A method of estimating timing and frequency information of a payload transmitted through multiple frequency separated channels, the method comprising:
   selecting a preamble associated with the payload and transmitted through one of the frequency separated channels, the selecting based upon a signal quality metric; and
   estimating the timing and frequency information of the payload transmitted through the multiple frequency separated channels using training fields of the preamble, the estimating being performed by a receiver,
   wherein selecting the preamble includes biasing a first channel by selecting a second channel only when the signal quality metric of the second channel exceeds the signal quality metric of the first channel by a predetermined amount.

2. The method of claim 1, wherein the signal quality metric includes a received signal strength indicator (RSSI), a signal to noise ratio (SNR), or an error vector measurement (EVM).

3. The method of claim 1, wherein the first channel is a control channel.

4. The method of claim 3, wherein biasing the first channel includes selecting an extension channel only when the signal quality metric of the extension channel exceeds the signal quality metric of the control channel by the predetermined amount.

5. A receiver for operation in a wireless communication system, the receiver being configured to perform steps comprising:
   selecting a preamble associated with a payload for transmission through one of multiple frequency separated channels, the selecting based upon a signal quality metric; and
   estimating timing and frequency information of the payload for transmission through the multiple frequency separated channels using training fields of the preamble,
   wherein selecting the preamble includes biasing a first channel by selecting a second channel only when the signal quality metric of the second channel exceeds the signal quality metric of the first channel by a predetermined amount.

6. The receiver of claim 5, wherein the signal quality metric includes a received signal strength indicator (RSSI), a signal to noise ratio (SNR), or an error vector measurement (EVM).

* * * * *